Figure 5:
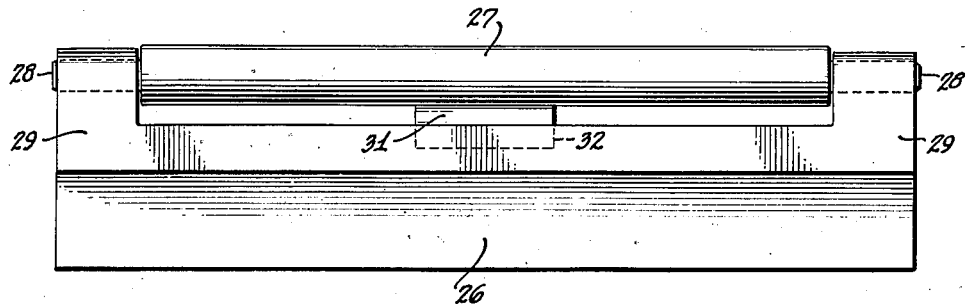

Oct. 26, 1943.    G. W. RAUSCHENBERGER    2,332,528
CENTERLESS GRINDER WORK SUPPORT
Filed Dec. 23, 1941    2 Sheets-Sheet 1
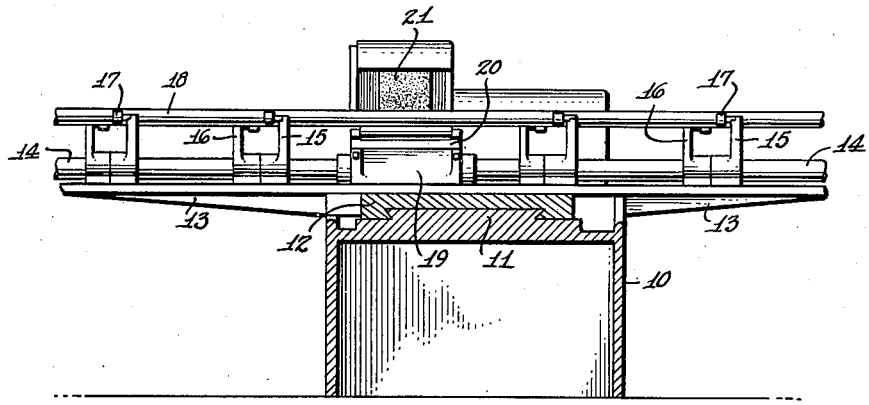
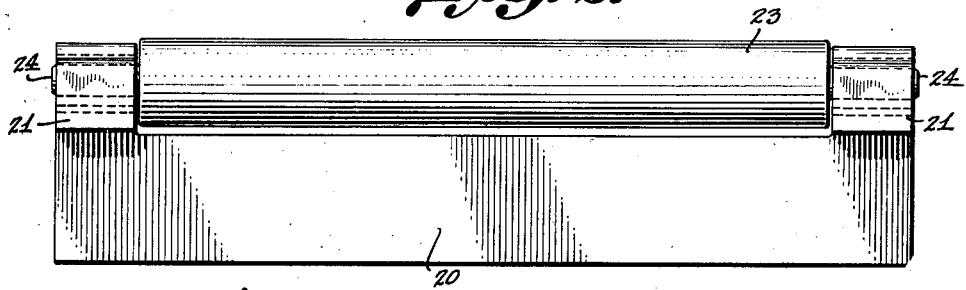
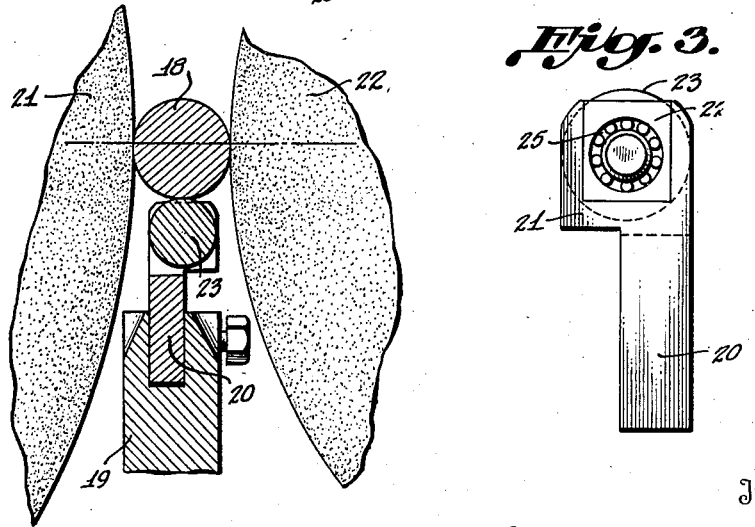
Inventor
GEORGE W. RAUSCHENBERGER
By James J. Shanley
Attorney Oct. 26, 1943.  G. W. RAUSCHENBERGER  2,332,528
CENTERLESS GRINDER WORK SUPPORT
Filed Dec. 23, 1941  2 Sheets-Sheet 2

Inventor
GEORGE W. RAUSCHENBERGER
By James J. Shanley
Attorney

Patented Oct. 26, 1943

2,332,528

UNITED STATES PATENT OFFICE 2,332,528

CENTERLESS GRINDER WORK SUPPORT

George W. Rauschenberger, Ecorse, Mich., assignor to National Steel Corporation, a corporation of Delaware Application December 23, 1941, Serial No. 424,186

8 Claims. (Cl. 51—103)

This invention relates to improvements in centerless grinders and especially to the positioning and support of work pieces therein.

In the conventional centerless grinder a grinding wheel and a regulating wheel oppose one another to form a grinding throat therebetween. The work piece to be ground is positioned in this throat on a work rest which is usually in the form of a blade making line contact with the work piece. If the work piece is long, auxiliary supporting members are necessary on either side of the throat to support that part of the work piece not in the throat. By canting the regulating wheel at an angle of a few degrees to the vertical, beside its function of maintaining the work in engagement with the grinding wheel, it performs the additional function of moving the work through the grinding throat.

A function of the blade forming the work rest is to produce a slight upward movement of the work piece in the grinding throat when small irregularities on the surface of the work piece engage the regulating wheel. This reduces the depth of cut taken at the instant by the grinding wheel. Where no auxiliary supports are used as described above the blade forms the sole support for the work piece.

In the operation of the conventional centerless grinder with auxiliary work supports the supports are set at a height such that the work engages the blade of the work rest. Usually those supports nearest the grinding throat are positioned so as to urge the work piece at that point toward the regulating wheel. Therefore when the work piece is moved up against the grinding wheel to take a heavy cut, the grinding wheel rotating in a direction that forces the work piece downwardly tends to move the work piece in a direction toward the regulating wheel but also slightly downwardly. This throws a considerable force upon the blade of the work rest which destroys the blade, causes chattering and marks the work. For these and other reasons there are very definite limitations on the amount of cut that can be taken on a given work piece where a blade is used as a work rest.

The present invention makes possible a relatively heavy cut on the work piece by the use of a long roller as a work rest which roller has line contact with the work piece throughout the grinding throat. With the roller an extremely heavy cut can be taken on the work piece without the limitations resulting from the use of a blade. It has been discovered that the center of the work piece can be positioned above or below the line of centers of the grinding and regulating wheels depending upon the radius of the work piece and the extent of cut to be taken. The use of the roller of the present invention does away with the highly critical positioning of the auxiliary supports adjacent the grinding throat. Its great length positioned right at the grinding wheel presents a support along a line extending through the grinding throat, thus preventing marking of the work piece at the point of greatest pressure. With the roller the work piece can be positioned so as to engage the roller and the auxiliary supporting elements moved into positions to prevent whipping. The entire operation in grinding a long bar, for example, requires much less adjustment and attention generally.

An important object of the present invention is the provision of a centerless grinding machine for taking large cuts on cylindrical work pieces.

A further important object of the present invention is the provision of a centerless grinder for long rods permitting through-feed of the rod through the grinder while taking a large cut.

A still further object of the present invention is the provision of a work rest for a centerless grinder incorporating an elongated roller mounted on antifriction bearings.

A still further important object of the present invention is the provision of a work rest for a centerless grinder incorporating an elongated roller mounted on antifriction bearings and having auxiliary work support means on both sides of the grinding throat.

Other objects and advantages of the present invention will be readily apparent from a consideration of the following specification and appended drawings in which—

Figure 6:
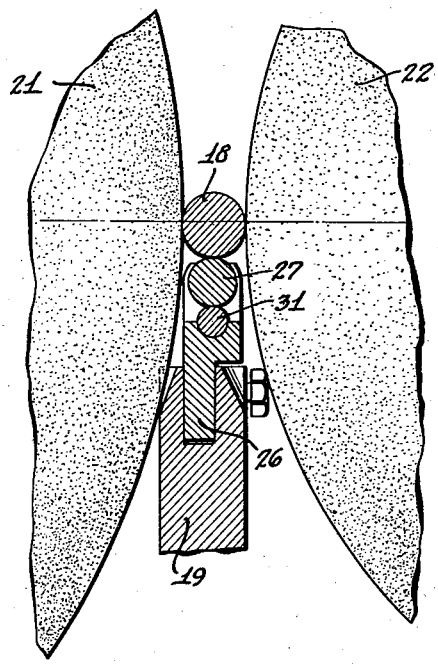
Figure 7:
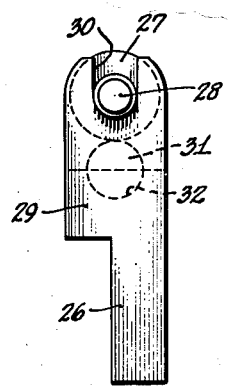

Figure 1 is a view partially in elevation and partially in section through the bed of a centerless grinder looking toward the grinding wheel, Figure 2 is a view in elevation of the work rest shown in Figure 1, Figure 3 is a view in end elevation of the work rest shown in Figure 2, Figure 4 is a fragmentary view partially in elevation and partially in cross-section taken through the work piece and work support in Figure 1, Figure 5 is a view in elevation of another embodiment of the work rest, Figure 6 is a view in end elevation of the work rest shown in Figure 5, and Figure 7 is a fragmentary view partially in elevation and partially in cross-section similar to Figure 4 but showing the work rest of Figure 5.

Referring to Figures 1 to 4 inclusive, reference numeral 10 designates the bed of a centerless grinding machine carrying a guide 11 on which is slidably keyed a movable frame 12. Frame 12 carries the usual structure not shown for supporting a regulating wheel (see Figure 4). Brackets 13 extending out on either side are carried by bed 10 and support tubular members 14 which in turn carry auxiliary supporting members 15, 16. Members 15 and 16 each carry antifriction devices 17, which engage and support the major portion of the work piece 18, the antifriction devices on members 15 being on one side of the work piece and those on member 16 being on the other side of the work piece to support the same between them. The height of the antifriction devices and the distance between those on members 15 and members 16 are adjustable. Supported on bed 10 so as to extend through the grinding throat of the machine is a work rest support 19 carrying a work rest 20. The work rest support and the work rest are located, respectively, below and in the grinding throat formed between grinding wheel 21 and regulating wheel 22 (see Figure 4).

As best shown in Figures 2 and 3 work rest 20 carries a pair of bearing housings 21 enclosing bearing chocks 22. An elongated roller 23 having spindles 24 carrying roller bearings 25 is mounted on work rest 20 by having the roller bearings mounted in chocks 22. Roller bearings are disclosed but any type of bearings may be used depending on the amount of friction desired.

Referring to Figures 5 to 7 inclusive a work rest 26 is shown in which the roller 27 is much more slender than the roller 23 of the work rest of Figures 2 to 4 inclusive. When a bar of small diameter is being ground the roller must be of less diameter so that it will fit in the grinding throat without contacting either wheel. As may sometimes be preferred a simplified bearing is disclosed for the roller of the work rest shown in Figures 5 to 7 inclusive. The roller merely carries spindles 28 which fit into end pieces 29 of work rest 26. These end pieces are recessed at 30 to receive the spindles 28. Elongated slender roller 27 when supporting a bar having a heavy cut taken thereon may have a tendency to flex and to prevent such flexure with its resulting strain on the roller and its bearings, a backing roller 31 is supplied. Backing roller 31 fits in a recess 32 in work rest 26. In the embodiment shown the backup roller merely turns in this recess although any other suitable rotational mounting may be used. Under some conditions a braking effect may be necessary on the roller of the work rest to prevent the roller and work piece from spinning and backing roll 31 mounted as disclosed performs this braking function. Proper design of the bearings of the roller may also be used to accomplish this braking where desired. It will be understood that backing roll 31 could be omitted from the work rest shown in Figure 5 or backing roll 31 could be retained and anti-friction bearings used for the roller to control the amount of braking.

In operation of either embodiment the work rest is so positioned that the center of the work piece or bar being ground is in the neighborhood of a line joining the centers of the grinding wheel and the regulating wheel. When a light cut is being taken it may be advantageous to have the center of the work piece above this line and where heavy cuts are being taken to have the center of the work piece below this line. For a bar of about 1½ inches in diameter it has been found that a distance of 1/16 of an inch below the line is satisfactory.

The conventional blade rest is positioned to the grinding wheel side of the grinding throat and includes an angularly inclined upper surface or top. The direction of slope on the top of the blade is such that downward pressure on the blade due to the action of the grinding wheel is resolved into a substantial horizontal component urging the bar away from the grinding wheel and toward the regulating wheel. Thus an attempt to take a heavy cut is nullified unless the blade gives transversely. When this happens a violent chattering results which marks the work. The roller of the instant invention is positioned substantially in the center of the throat with its axis substantially directly below the axis of the work piece so no lateral thrust results when a heavy cut is taken. It is unnecessary to limit the cut with the lateral thrust action because the bearings of the roller readily support the increased pressure of a heavy cut.

In grinding a long rod the machine is set up with auxiliary supporting members 15 and 16 so positioned that antifriction devices 17 hold the bar at the height of the roller. Devices 17 are so aligned that the rod goes straight through the grinding throat making line contact with the roller. The regulating wheel moves the work piece through the machine and the auxiliary supporting members with their antifriction devices on the exit side of the grinding throat support the rod. Extremely heavy cuts can be taken off the rod to obtain a rough finish after which a light cut gives the desired high polish.

As an example of the great improvement in operation of the machine of the present invention over conventional machines using blades as work rests, the following tests are cited:

A type of bar having a diameter of 1½ inches and a length of 177⅜ inches was passed in large lots through a machine incorporating the present invention and a conventional type machine for comparison. The machine of the present invention removed all the metal required to prepare the bars for a finish grinder in one pass. The conventional machine required six roughing passes to attain the same goal. At the same time the machine incorporating the present invention made more passes than the conventional machine. Here was more than a 500% gain since the bars passing through the conventional machine had to be each returned for five more passes. The conventional machine operating on this type of bar will remove .006 of an inch from the diameter on each roughing pass. The machine of the present invention will remove .040 of an inch from the diameter of each roughing pass. Thus a shipment of these bars was finished in less than ¼ of the time by the use of the present invention. Additionally the reduction in friction resulted in a saving of about 25% coolant soluble oil over that when a blade was used.

I claim:

1. A centerless grinder for cylindrical work pieces comprising opposing grinding and regulating wheels spaced to form a grinding throat for the reception of a work piece, a work rest, an elongated roller rotatably mounted on the work rest and positioned to engage the work piece in the grinding throat, and a backing roller mounted on the work rest and positioned to engage the elongated roller when a heavy cut is being taken on the work piece.

2. A centerless grinder for cylindrical work pieces comprising opposing grinding and regulating wheels spaced to form a grinding throat for the reception of a work piece, a work rest, an elongated roller rotatably mounted on the work rest and positioned to engage the work piece in the grinding throat, and a backing roller mounted on the work rest extending coaxially with the elongated roller and positioned to engage the same when a heavy cut is being taken on the work piece.

3. A centerless grinder for cylindrical work pieces comprising opposing grinding and regulating wheels spaced to form a grinding throat, a work rest, roller means positioned to engage the work piece rotatably mounted on the work rest and extending through the grinding throat and supporting means on the work rest rotatably supporting the roller means intermediate the length of the same.

4. A centerless grinder for cylindrical work pieces comprising opposing grinding and regulating wheels spaced to form a grinding throat for the reception of a work piece, a roller extending through the throat for line engagement with the work piece, bearing members located without the throat and portions on the roller rotatably received by the bearing members, the axis of the roller being substantially directly below the axis of the work piece.

5. A centerless grinder for cylindrical work pieces comprising opposing grinding and regulating wheels spaced to form a grinding throat for the reception of a work piece, a roller extending through the throat for line engagement with the work piece, bearing members located without the throat, portions on the roller rotatably received by the bearing members, and friction control means in addition to the friction inherent at the bearing members to impose a controlled braking effect on the roller.

6. A centerless grinder for cylindrical work pieces comprising opposing grinding and regulating wheels spaced to form a grinding throat for the reception of a work piece, a roller extending through the throat for line engagement with the work piece, bearing members located without the throat, portions on the roller rotatably received by the bearing members, and friction control means acting on the roller at a point intermediate the bearing members to impose a controlled braking effect on the roller.

7. A centerless grinder for cylindrical work pieces comprising opposing grinding and regulating wheels spaced to form a grinding throat for the reception of a work piece, an elongated rigid roller extending through the throat for line engagement with the work piece, bearing members located without the throat and portions on the roller rotatably received by the bearing members, the axis of the roller being substantially directly below the axis of the work piece.

8. A centerless grinder for cylindrical work pieces comprising opposing grinding and regulating wheels spaced to form a grinding throat for the reception of a work piece, the regulating wheel being mounted so as to cause through-feed of the work piece through the grinding throat, a roller extending through the throat for line engagement with the work piece, bearing members located without the throat, portions on the roller rotatably received by the bearing members, the axis of the roller being substantially directly below the axis of the work piece and auxiliary supporting means on either side of the grinding throat for supporting a work piece in engagement with the roller.

GEORGE W. RAUSCHENBERGER.